(12) United States Patent
Hess (10) Patent No.: US 8,238,589 B2
(45) Date of Patent: Aug. 7, 2012

(54) OBJECTIVE QUANTIFICATION OF AUDITORY SOURCE WIDTH OF A LOUDSPEAKERS-ROOM SYSTEM

(75) Inventor: Wolfgang Hess, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1165 days.

(21) Appl. No.: 12/034,404

(22) Filed: Feb. 20, 2008

(65) Prior Publication Data

US 2008/0247556 A1    Oct. 9, 2008

(30) Foreign Application Priority Data

Feb. 21, 2007  (EP) ..................................... 07003585

(51) Int. Cl.
*H04R 5/00*  (2006.01)
*H04R 5/02*  (2006.01)
*H04R 29/00*  (2006.01)

(52) U.S. Cl. ................ 381/309; 381/1; 381/17; 381/26; 381/59; 381/303; 381/310

(58) Field of Classification Search .................. 381/309, 381/59, 26, 17
See application file for complete search history.

(56) References Cited

U.S. PATENT DOCUMENTS

| | | | | | |
|---|---|---|---|---|---|
| 4,975,954 | A | * | 12/1990 | Cooper et al. | 381/26 |
| 5,161,197 | A | * | 11/1992 | Griesinger | 381/56 |
| 5,325,436 | A | * | 6/1994 | Soli et al. | 381/313 |
| 5,638,343 | A | * | 6/1997 | Ticknor | 369/4 |
| 5,982,903 | A | * | 11/1999 | Kinoshita et al. | 381/18 |
| 6,118,875 | A | * | 9/2000 | Møller et al. | 381/1 |
| 7,197,151 | B1 | * | 3/2007 | Sibbald et al. | 381/310 |
| 7,333,622 | B2 | * | 2/2008 | Algazi et al. | 381/310 |
| 7,792,674 | B2 | * | 9/2010 | Dalton et al. | 704/270 |
| 7,840,019 | B2 | * | 11/2010 | Slaney et al. | 381/303 |
| 2003/0161478 | A1 | * | 8/2003 | Nelson et al. | 381/17 |
| 2004/0013271 | A1 | * | 1/2004 | Moorthy | 381/1 |
| 2004/0086131 | A1 | * | 5/2004 | Ringlstetter et al. | 381/59 |
| 2004/0136538 | A1 | * | 7/2004 | Cohen et al. | 381/17 |
| 2005/0078833 | A1 | * | 4/2005 | Hess et al. | 381/26 |
| 2005/0141723 | A1 | * | 6/2005 | Lee et al. | 381/26 |
| 2005/0147261 | A1 | * | 7/2005 | Yeh | 381/92 |
| 2005/0265558 | A1 | * | 12/2005 | Neoran | 381/17 |
| 2006/0067548 | A1 | * | 3/2006 | Slaney et al. | 381/303 |
| 2007/0270988 | A1 | * | 11/2007 | Goldstein et al. | 700/94 |

(Continued)

FOREIGN PATENT DOCUMENTS

EP    1 522 868 A1    4/2005

OTHER PUBLICATIONS

European Search Report for Application No. EP 07 00 3585, dated Jul. 12, 2007 (3 pgs.).

(Continued)

*Primary Examiner* — Elvin G Enad
*Assistant Examiner* — Christina Russell (57) ABSTRACT

A source width estimation system may estimate an auditory source width of a sound. The system detects a first frequency modulated noise signal and a second frequency modulated noise signal. The detected noise signals may be processed to obtain an average value of a lateral width of a binaural activity over time and a plurality of sub-bands. The auditory source width of the noise signals may be determined from the average value of the lateral width of the binaural activity.

17 Claims, 4 Drawing Sheets

U.S. PATENT DOCUMENTS

| | | | | |
|---|---|---|---|---|
| 2008/0025519 A1* | 1/2008 | Yu et al. | | 381/17 |
| 2008/0031462 A1* | 2/2008 | Walsh et al. | | 381/17 |
| 2008/0037796 A1* | 2/2008 | Jot et al. | | 381/17 |
| 2008/0212788 A1* | 9/2008 | Bech et al. | | 381/59 |
| 2008/0260166 A1* | 10/2008 | Hess | | 381/26 |

OTHER PUBLICATIONS

Hess, W. et al., "Acoustical evaluation of virtual rooms by means of binaural activity patterns," Presented at the 115th AES Convention, Oct. 2003, pp. 1-8.

Hess, W. et al., "Evaluation of auditory spatial impression in performance spaces," Forum Acusticum Budapest, European Congress on Acoustics, Aug. 2005, pp. 1735-1740.

Blauert, J., "Instrumental Analysis and Synthesis of Auditory Scenes: Communication Acoustics," AES 22nd International Conference on Virtual, Synthetic and Entertainment Audio, Jun. 2002, pp. 1-9.

Grantham, D. W., and Wightman, F., "Detectability of varying interaural temporal differences," Acoustical Society of America, Journal, vol. 63, No. 2, Feb. 1978, pp. 511-523.

Lindemann, W., "Extension of a binaural cross-correlation model by contralateral inhibition. I. Simulation of lateralization for stationary signals." Journal of the Acoustical Society of America, vol. 80, No. 6, Dec. 1986, pp. 1608-1622.

Hess, W. et al., "Evaluierung von Räumen anhand binauraler Aktivitätsmuster," Institut für Kommunikationsakustik (IKA), Ruhr-Universität Bochum, DAGA '03, Band 1 and Band 2, 2003, pp. 1-7.

Merimaa, J. and Hess, W., "Training of Listeners for Evaluation of Spatial Attributes of Sound," Audio Engineering Society, Presented at the 117th Convention, Oct. 2004, San Francisco, CA, pp. 1-18.

Gaik, W., "Combined evaluation of interaural time and intensity differences: Psychoacoustic results and computer modeling," J. Acoust. Soc. Am. 94(1), Jul. 1993, pp. 98-110.

Blauert, J. and Cobben, W., "Some Consideration of Binaural Cross Correlation Analysis," Acustica, vol. 39 (1978), pp. 96-104.

Jeffress, L., "A Place Theory of Sound Localization," The Journal of Comparative and Physiological Psychology, vol. 41, Baltimore, MD, 1948, pp. 35-39.

International Standard, ISO-226, "Acoustics—Normal equal-loudness-level contours," Second Edition, 2003, pp. 1-18.

* cited by examiner

OBJECTIVE QUANTIFICATION OF AUDITORY SOURCE WIDTH OF A LOUDSPEAKERS-ROOM SYSTEM

PRIORITY CLAIM

This application claims the benefit of priority from European Patent Application No. 07003585.2, filed Feb. 21, 2007, which is incorporated by reference.

BACKGROUND OF THE INVENTION

1. Technical Field

This application relates to auditory spatial perception and, more particularly, to estimating an auditory source width of a sound in a loudspeakers-room system.

2. Related Art

The perceived acoustic quality of a sound source may depend on the acoustic characteristics of the structures in the vicinity of the sound source. As a sound propagates away from its source, a portion of the sound reaches the listener as direct sound that follows a straight path from the source to the listener's ear. A large portion of the sound, however, radiates in all directions from the source and encounters boundaries (e.g., walls). The combined direct sound and reflections that arrive at the listener's ear cause auditory spatial perception. The reflected sound may be delayed and frequency colored. The delay, frequency coloration, and reverberation of sound events in the spatial (3D) dimensions of a room may be captured and interpreted to give humans an auditory perception of the sound system and the space in which a sound travels.

The sound reflections may be classified as early lateral reflections and late reflections. The relationship of early lateral reflections with direct sound may be used to determine the direction and location of the sound source. Due to the reverberation characteristics of a listening room, the auditory source is perceived as exhibiting a finite lateral extent. Additionally, the temporal and spatial separation of sound energy of the late reflections causes the perception of being enveloped by the sound. This phenomenon is known as the listener envelopment.

The acoustic characteristics of various rooms often differ. A concert hall may have different acoustic characteristics than a vehicle compartment. The spatial auditory characteristics of a room may be classified through monaural parameters. These monaural parameters may be the Clarity C80 and Definition D50, the Early Decay Time Gap (EDTG), or Center Time TS. However, these parameters may not correlate with perceptible characteristics. Others may use binaural parameters to quantify the spatial auditory characteristics of a room. These binaural parameters may be the Interaural Cross-Correlation (IACC) or Lateral Energy Fraction (LEF). However, these parameters may significantly depend on the measurement position. Furthermore, a ranking of listener rooms (e.g., concert halls) based on such established parameters may not sufficiently match the actual auditory perception and preferences of human listeners.

SUMMARY

A source width estimation system may estimate an auditory source width of a sound. The system detects a first frequency modulated noise signal and a second frequency modulated noise signal. The detected noise signals may be processed to obtain an average value of a lateral width of a binaural activity over time and a plurality of sub-bands. The auditory source width of the noise signals may be determined from the average value of the lateral width of the binaural activity.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
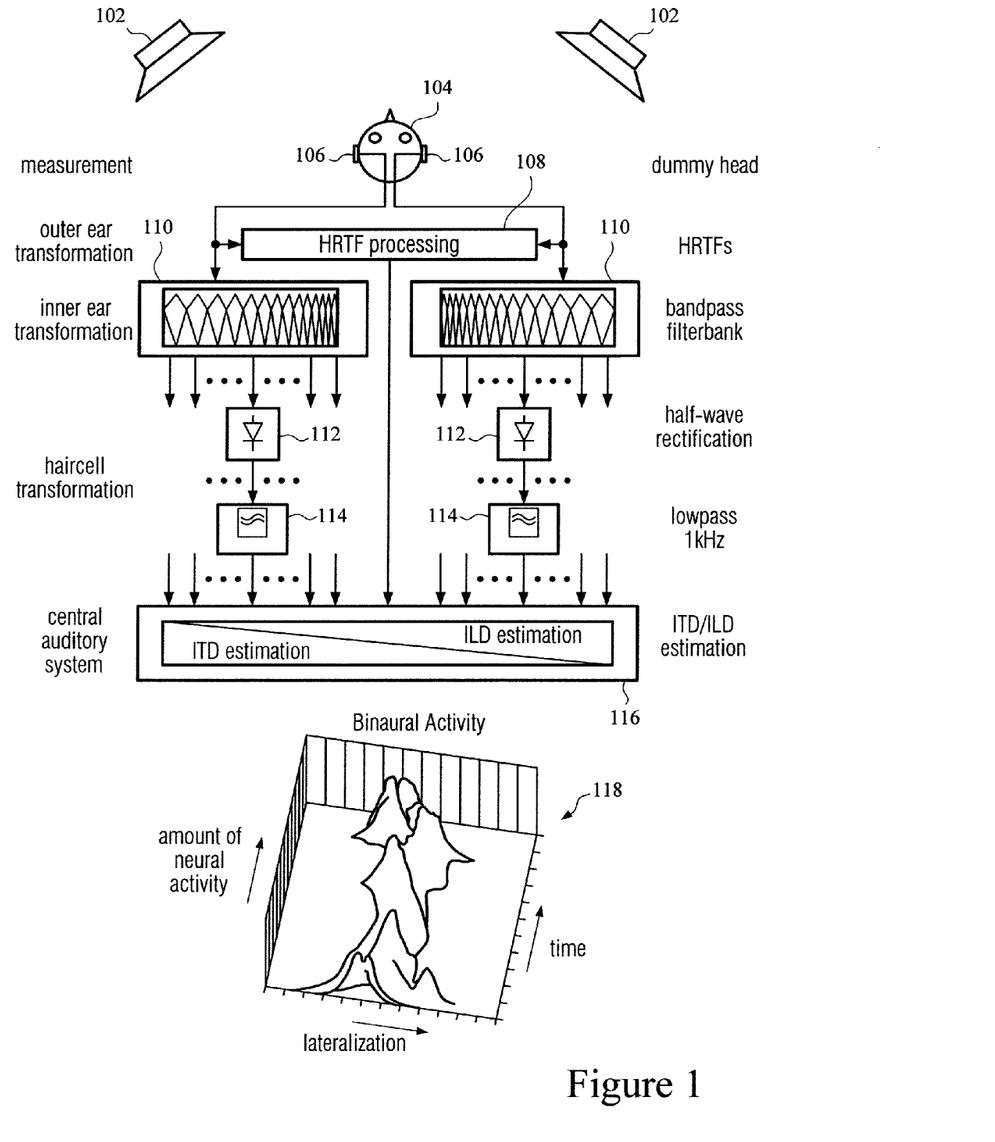
FIG. 1 illustrates the estimation of an auditory source width of a sound in a loudspeakers-room system.

FIG. 1 illustrates the estimation of an auditory source width of a sound in a loudspeakers-room system. A sound detection device may be placed in a room to test the spatial auditory characteristics of the room. The room may be a concert hall, vehicle compartment, home entertainment room, or other listening space. The acoustic characteristics of the room may alter the auditory source width of the sound as it passes through the space. Therefore, the auditory source width of the detected sound may serve as an objective quantification of the acoustic characteristics of the room or space. This quantification may be independent of measurement position. Furthermore, this quantification may be in compliance with human auditory spatial perception.

An auditory source width (acoustic source width) may be determined by processing noise signals output from a set or pair of loudspeakers 102. In some systems, the loudspeakers 102 may transmit sinusoidally fluctuating interaural time difference ("ITD") noises. The noise signals may be functions of some predetermined maximum interaural time interval $\Delta t$ that is part of the argument of a sinus function and results in some interaural time differences in the noise signals. The interaural time differences caused by the time interval $\Delta t$ may be contained in the generated noise signals independent of the actual loudspeakers-room transfer and the actual position of signal measurement. The output of each loudspeaker 102 may correspond to one auditory stereo channel. The left and right noise signals output by the pair of loudspeakers 102 may be generated by a computer according to the following:

$$l(t) = \sum_{i=1}^{N} A\sin\left(\frac{2\pi f_i t}{F_s} + \theta_i + \pi f_i \Delta t \sin\left(\frac{2\pi F_M t}{F_s}\right)\right)$$

and $$r(t) = \sum_{i=1}^{N} A\sin\left(\frac{2\pi f_i t}{F_s} + \theta_i - \pi f_i \Delta t \sin\left(\frac{2\pi F_M t}{F_s}\right)\right),$$

where A represents an amplitude, where $f_i$ represents carrier frequencies, where $F_M$ represents a modulation frequency, where $F_s$ represents a sampling rate, where $\Delta t$ represents a predetermined maximum interaural time differences, where $\theta_i$ represents arbitrarily chosen phases, and where t represents a discrete time index. Alternatively, the left and right noise signals output by the pair of loudspeakers 102 may be generated by a computer without explicit dependence of the respective right terms of the formulae on the carrier frequencies according to the following:

$$l(t) = \sum_{i=1}^{N} A\sin\left(\frac{2\pi f_i t}{F_s} + \theta_i + \pi f_i \Delta t \sin\left(\frac{2\pi F_M t}{F_s}\right)\right)$$

and $$r(t) = \sum_{i=1}^{N} A\sin\left(\frac{2\pi f_i t}{F_s} + \theta_i - \pi f_i \Delta t \sin\left(\frac{2\pi F_M t}{F_s}\right)\right).$$

Therefore, two frequency-modulated broadband noise signals may be generated and transmitted with a predetermined maximum interaural time difference that changes periodically as a function of time. The noise signals may be stereo signals. The distance of the carrier frequencies of the two signals may be chosen as some tenth part of 1 Hz, e.g., 0.1 Hz. The modulation frequencies may range from some Hz to some thousand Hz. The maximum interaural time difference may be chosen from $\Delta t$=about 10 µs to about 1000 µs, such as about 60 µs, about 90 µs, about 120 µs, about 150 µs, or about 180 µs. The arbitrary phases may be randomly chosen for every signal from 0 to $2\pi$. The sampling rate may be about 48 kHz.

Noise signals according to the equations above may be used for the analysis of the acoustic characteristics of a loudspeakers-room system. When the noise signals are transmitted by the loudspeakers 102 into a room, the surrounding surfaces may reflect, scatter, and bundle sound signals and mix phase relations. The acoustic characteristics of the room may alter the auditory source width of the noise signals.

The noise signals transmitted from the loudspeakers 102 may be detected by a binaural recording device 104. The binaural recording device 104 may comprise one or more microphones 106, or other sound detection devices, installed in or linked to a dummy head. The microphones 106 may be installed within a pair of ear-shaped molds on the dummy head. In some systems, the dummy head may be placed on a torso with shoulders, assembled on a manikin, or placed on a stand. In other systems, the dummy head may be placed on some other structure in the room. The use of a dummy head to record the noise signals output from the loudspeakers 102 may provide a realistic loudspeaker-room-listener sound transfer.

The sound detection devices 106 of the binaural recording device 104 may detect the noise signals output from the loudspeakers 102. Each of the sound detection devices 106 may detect both noise signals and thus interaural time differences and interaural level differences ("ILD") may be present in the detected signals similar to the perception of a human listener. The binaural recording device 104 produces recorded signals that are based on the detected noise signals. These recorded signals may then be processed to determine the auditory source width of the detected noise signals.

The signals detected by the binaural recording device 104, the digital microphone signals, may be subject to processing that models the processing of audio signals by the human auditory system. Specifically, the detected sound signals may be passed though a sound analyzing system to estimate the acoustic characteristics of a room. First, the detected sound signals may be filtered to correspond to the treatment that occurs by outer ears, such as the pinnae. The detected may be processed by head-related transfer function ("HRTF") processing 108. The filtering by the head-related transfer functions 108 may be performed through the pinnae of a dummy head. Some systems may use a dummy head positioned upon a manikin to account for the reflections and deflections caused by the human torso, head, and the pinna.

Selected signals of the detected sound within a predetermined frequency range (band) may be processed by bandpass filter banks 110 in order to model the binaural processing by the inner ear. The bandpass filter banks 110 represent the division of the audio signal in frequency bands by the cochlea. The bandpass filter banks 110 may comprise auditory filter banks, such as non-uniform auditory bandpass filter banks. The bandpass filter banks 110 separate the detected sound signals into a plurality of sub-band signals for a predetermined number of sub-bands.

After being split into sub-band signals, each of the sub-band signals may be processed by half-wave rectification 112 and a low-pass filter 114 to model the processing according to the hair cell transformation that would occur in the human auditory system. The low-pass filtering 114 may use a cut-off frequency of about 1 kHz.

Next, the interaural time differences and interaural level differences may be estimated at an ITD/ILD estimation unit 116 from a combination of the processed detected sound signals. This binaural processing may be supplemented by monaural processing of the individual detected sound signals to simulate the processing of an audio signal input exclusively to one ear.

If a sound source is closer to one ear of a listener than to the other, the sounds generated by the sound source will arrive at slightly different times at the respective ears. This difference in arrival times is termed interaural time difference or ITD. The difference in sound level at the different ears is termed interaural level difference or ILD. Interaural level differences may be caused by some shading due to the head position. Experiments have shown that interaural time differences, interaural level differences, and the sound spectrum are the main clues for auditory localization in three dimensions. The human auditory system may process these qualities for auditory spatial perception.

The binaural activity over time and the lateral width for each of the sub-bands of the detected sound may be determined by combining the interaural time differences and the interaural level differences. The lateral width of the binaural activity may be used to determine the auditory source width. The lateral width of the binaural activity may serve as a reliable and satisfying quasi-objective estimate for the auditory source width. The interaural time differences may be measured to determine the influences of the acoustic room and the loudspeakers-system on the generated sounds.

The information obtained by the binaural and monaural processing is combined in a signal processing unit 118 and subject to a correlation-azimuth transformation to obtain a three-dimensional binaural activity analysis over time. The lateralization (e.g., the lateral width of the binaural activity measured in degrees with 0° for the meridian plane) may be obtained as a measure for the auditory source width. The lateralization or lateral width may range from −90° to +90°. A determined value of the binaural activity that lies below a predetermined value may be set to zero. By this measure, side-lobes that occur along the lateral width distribution of the determined binaural activity for rather high activity values may be suppressed to prevent the side-lobes from affecting the reliability of the result for the determined auditory source width.

The detected sound signals are processed in the sub-band domain similar to the human physiologic processing of audio signals and the binaural activity pattern may be determined for one or more of the sub-bands. The binaural activity represents a three-dimensional output obtained by processing the detected sound signals. The binaural activity obtained by processing audio signals in a manner similar to the processing of the human auditory system may be seen as a measure for binaural neural activity. It results from a cross-correlation analysis of the detected auditory bandpass filtered signals.

It is noted that detailed experiments have been carried out with test persons as listeners that have been provided with interaural time difference noise signals directly through headphones. The test persons judged their subjective impressions with respect to the auditory source width and their judgments have been compared with the results of the calculations of the auditory source width based on the above-mentioned algorithm. The empirical studies have shown that the amount of the auditory source width depends on the phase shift between the interaural time difference noise signals and the frequency distance of the narrow-band noise signals.

As shown in FIG. 1, head-related transfer function processing 108 may be performed for remapping in the central processing unit. An estimation of the azimuth angle may be done by a remapping function that takes into account the head-related transfer functions.

Figure 2:
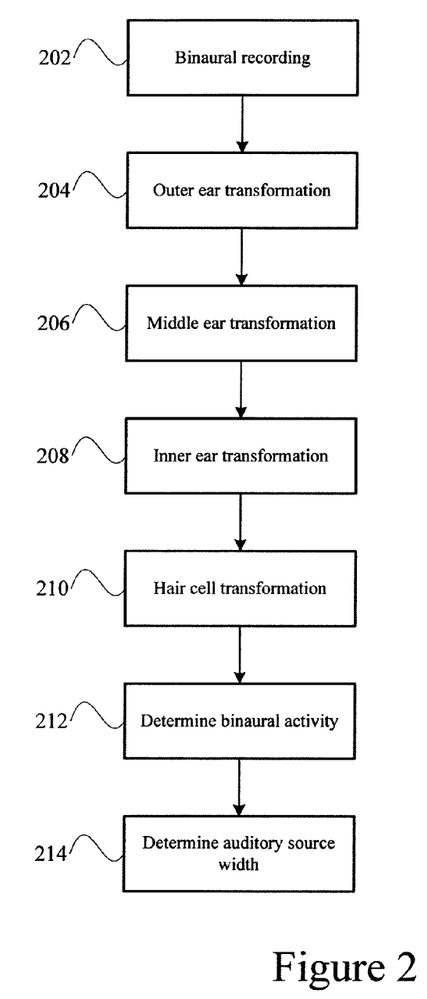
FIG. 2 is a method of processing a detected sound to determine an auditory source width of the detected sound.

FIG. 2 is a method of processing a detected sound to determine an auditory source width of the detected sound. At act 202, a first noise signal and a second noise signal are detected binaurally to obtain detected signals. The detected noise signals may be processed to simulate the transformations that would occur in the human auditory system. Specifically, the binaural localization model algorithm used to process the detected noise signals may be adapted based on experimental results in order to reproduce the processing of the human auditory system.

At act 204, the detected signals are processed in a way that corresponds to physiologic filtering of a human outer ear. The human outer ear modifies sound waves in transferring the acoustic vibrations to the ear drum (tympanic membrane). The outer ear comprises a partially cartilaginous flange (the pinna) which includes a resonant cavity (the concha) at the entrance to the ear canal (external auditory meatus). The ear canal terminates at the ear drum, which may be considered as the interface of the outer and middle ear.

At act 206, the detected signals are further processed in a way that corresponds to physiologic filtering of a human middle ear. Sound reaches the inner ear or cochlea via three middle ear bones (the malleus, incus, and stapes) which form an interconnecting link between the ear drum and the input port of the cochlea. The transformer action of the middle-ear helps to match the impedance of the air in the ear canal to the much higher impedance of the cochlea fluids. This impedance transformation may serve to increase the sensitivity of the auditory system.

At act 208, the detected signals are further processed in a way that corresponds to physiologic filtering of a human inner ear. The inner ear (cochlea) may divide a received sound into multiple frequency bands. At act 210, the detected signals are further processed in a way that corresponds to a hair cell transformation.

At act 212, a binaural activity is determined. The binaural activity may be obtained by determining the interaural time differences and the interaural level differences of the noise signals that have been processed to simulate the processing of the human auditory system. The interaural time differences and the interaural level differences may be combined to determine the binaural activity.

At act 214, an auditory source width of the detected sound is determined from the binaural activity. This may be done by determining the lateralization (i.e., the lateral or horizontal width) of the obtained binaural activity. An objective quantitative estimation of the acoustic characteristics of a loudspeakers-room system may be achieved on the basis of the determination of the auditory source width as indicated by the binaural activity.

Figure 3:
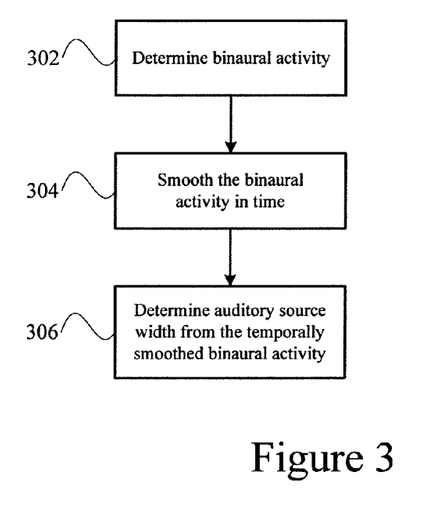
FIG. 3 illustrates the determination of an auditory source width from temporally smoothed binaural activity.

FIG. 3 determines an auditory source width from temporally smoothed binaural activity. At act 302, the binaural activity of a detected sound is determined. At act 304, the binaural activity is smoothed in time. Temporal smoothing may serve to model the auditory processing of the human auditory system. Specifically, a temporal smoothing may be used to simulate the binaural sluggishness of the human auditory system. The smoothing may be accomplished through a floating (running) rectangular integration window of about 10 to about 200 milliseconds in duration. In some systems, the floating rectangular time window may be about 50 to about 150 milliseconds in duration. In other systems, the floating rectangular time window may be about 100 milliseconds in duration. A time window of a predetermined duration may overlay the binaural activity such that a temporal smoothing or integration results. This causes a smoothing of the lateral sinusoidal binaural activity. The lateral extent of the binaural activity may, thus, be determined as an absolute measure for the auditory source width. Due to the floating rectangular integration window, this measure may be relatively constant. At act 306, the auditory source width of the detected sound may be determined from the lateral width of the temporally smoothed binaural activity.

Figure 4:
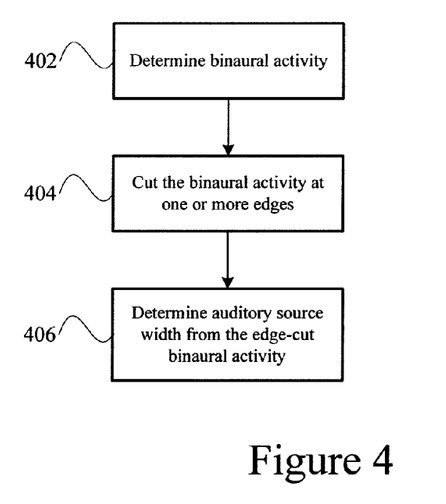
FIG. 4 illustrates the determination of an auditory source width from edge-cut binaural activity.

FIG. 4 determines an auditory source width from edge-cut binaural activity. At act 402, the binaural activity of a detected sound is determined. At act 404, the binaural activity may be cut at one or more edges. Cutting the edges of the binaural activity may avoid side-lobes. The edges may be cut adaptively by using a cutting function with an adaptive threshold. Side-lobes may occur more often when the binaural activity density is high. Thus, an adaptive threshold depending on the activity density may efficiently suppress side-lobes. Single auditory events below the adaptive threshold may be cut to weight lateral deviation of the binaural activity. At act 406, the auditory source width of the detected sound may be determined from the edge-cut binaural activity.

Figure 5:
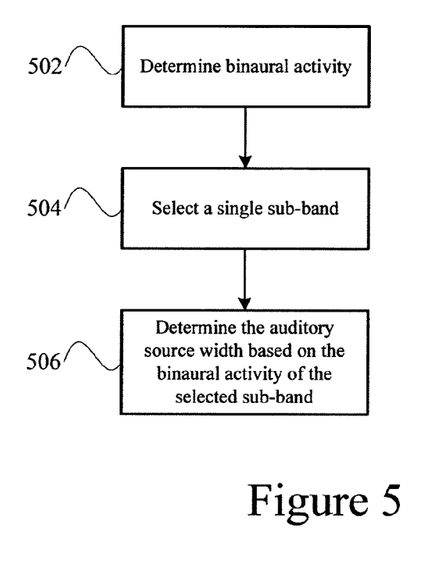
FIG. 5 illustrates the determination of an auditory source width from binaural activity of a single sub-band of a detected sound.

FIG. 5 determines an auditory source width from binaural activity of a single sub-band of a detected sound. At act 502, a binaural activity of a detected sound is determined. At act 504, a single sub-band is selected. At act 506, the auditory source width of the detected sound is determined based on the binaural activity of the selected sub-band. The auditory source width may be determined by the value of the lateralization of the binaural activity of the selected sub-band averaged over time.

Figure 6:
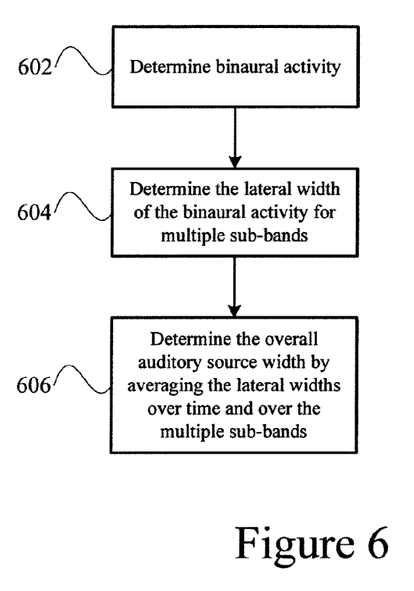
FIG. 6 illustrates the determination of an auditory source width from binaural activity of multiple sub-bands of a detected sound.

FIG. 6 determines an auditory source width from binaural activity of multiple sub-bands of a detected sound. At act 602, the binaural activities of multiple sub-bands of the detected sound are determined. In some systems, the binaural activities for a subset of all the sub-bands may be determined. In other systems, the binaural activity of all auditory frequency bands may be determined. At act 604, the lateral width of the binaural activities of each of the selected sub-bands may be determined. At act 606, the overall auditory source width may be determined by averaging the determined lateral widths over time and the multiple frequency bands. Specifically, the value of the lateralization of the binaural activity may be averaged over time and over the multiple sub-bands. Averaging the auditory source width over time and multiple sub-bands may provide a reliable estimate for the auditory source width of the detected sound.

Furthermore, the auditory source width may be estimated by the lateral extent of the binaural activity in single frequency-bands which is weighted over all or selected auditory frequency bands by applying a weighting curve. The weighting may be performed depending on the binaural activity density. The estimate of the auditory source width may be determined from more than one frequency band. Using more than one frequency band may result in a satisfying quantitative estimate for the acoustic characteristics of the loudspeakers-room system. The weighted average of the auditory source widths for the filtered sub-band signals for which binaural activities are determined may be determined by applying a frequency weighting curve similar to an equal loudness curve, such as the equal loudness curve according to ISO 226 or the 468-weighting curve that was originally proposed in CCIR recommendation 468.

Figures 7, 8:
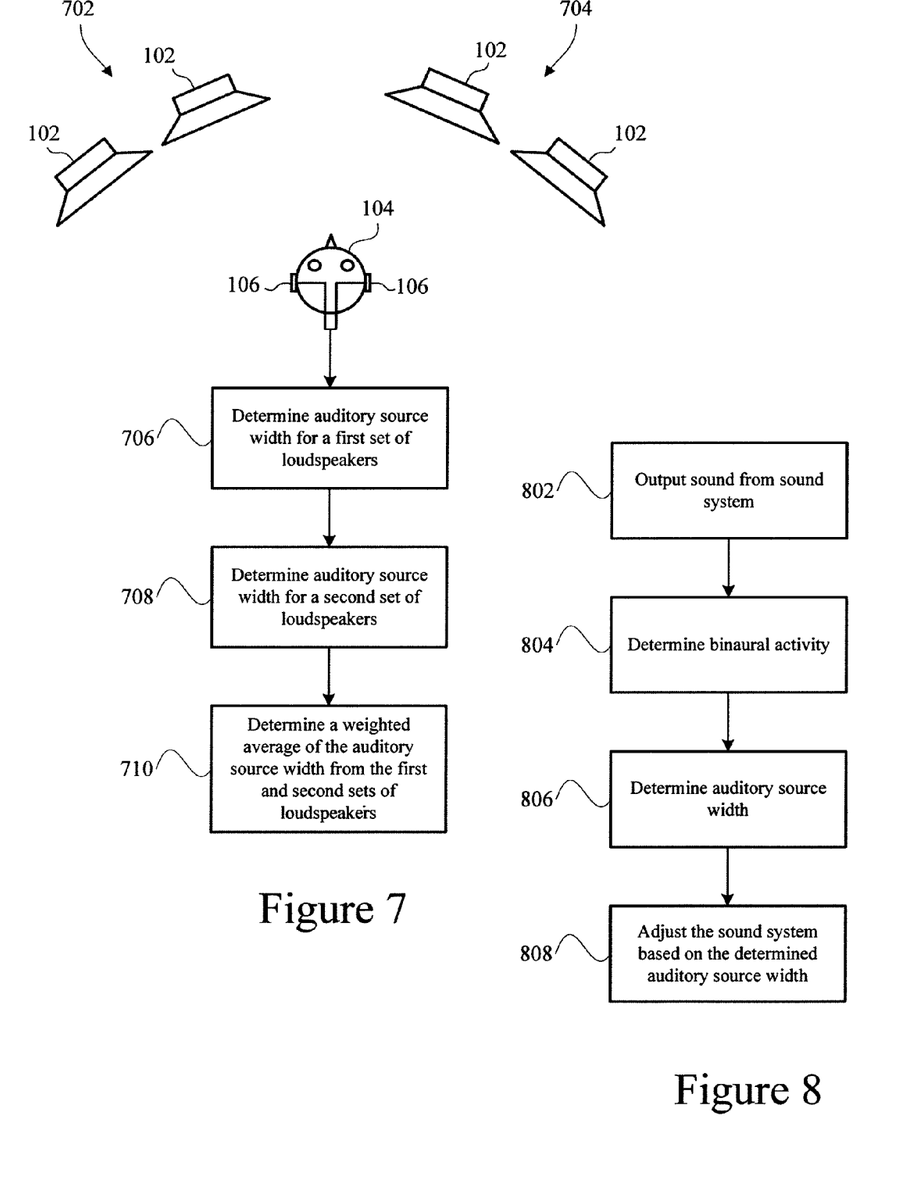
FIG. 7 illustrates the determination of a weighted average auditory source width based on sounds output from multiple sets of loudspeakers.
FIG. 8 illustrates the adjustment of a sound system based on an auditory source width of a detected sound.

FIG. 7 determines a weighted average auditory source width based on sounds output from multiple sets of loudspeakers. One of the loudspeakers in a first set 702 of loudspeakers 102 and one of the loudspeakers in a second set 704 of loudspeakers 102 may both output a first noise signal. Another of the loudspeakers in the first set 702 of loudspeakers 102 and another of the loudspeakers in the second set 704 of loudspeakers 102 may both output a second noise signal. The noise signals output from the loudspeakers 102 may be detected by the binaural recording device 104. The binaural recording device 104 may comprise one or more microphones 106, or other sound detection devices, installed in a dummy head.

At act 706, an auditory source width is determined for the output of the first set 702 of loudspeakers 102. At act 708, an auditory source width is determined for the output of the second set 704 of loudspeakers 102. At act 710, a weighted average of the auditory source width of the first set 702 of loudspeakers 102 and the second set 704 of loudspeakers 102 is determined. The auditory source width of each set of loudspeakers may be weighted depending on the position of each set of loudspeakers in the room of the loudspeakers-room system. Thus, the acoustic characteristics of the loudspeakers-room system that comprises multiple sets of loudspeakers may be quantitatively estimated on the basis of the determined single value for the weighted overall auditory source width in dependence on the spatial arrangement of multiple sets of loudspeakers.

FIG. 8 illustrates the adjustment of a sound system based on an auditory source width of a detected sound. The sound system may be located in a concert hall, vehicle compartment, home entertainment room, or other listening space. At act 802, the sound system outputs a sound. The sound may be part of an audio track played by a user. Alternatively, the sound may be generated for the purposes of calibrating the sound system. At act 804, a binaural activity of a detected sound is determined. At act 806, the auditory source width of the detected sound is determined from the binaural activity of the detected sound. At 808, the sound system may be adjusted based on the determined auditory source width. Specifically, one or more audio settings of the sound system may be changed based on the determined auditory source width. The adjustments or changes to the audio settings of the sound system may attempt to improve the spatial audio quality of the sound system. The adjustments or changes to the audio settings based on the determined auditory source width may serve to customize the sound for the acoustic characteristics of the listening space. Adjusting the sound system based on the determined auditory source width may reduce the time and cost to customize a sound system for a particular listening space.

Each of the processes described may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are described as being stored in memories, all or part of the systems, including processes and/or instructions for performing processes, consistent with the system may be stored on, distributed across, or read from other machine-readable media, for example, secondary storage devices such as hard disks, floppy disks, and CD-ROMs; a signal received from a network; or other forms of ROM or RAM resident to a processor or a controller.

Specific components of a system may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), databases, and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method, comprising:
   detecting a first frequency modulated noise signal and a second frequency modulated noise signal;
   filtering the detected noise signals to obtain sub-band signals for a plurality of sub-bands;
   determining a binaural activity over time and a lateral width for each of the plurality of sub-bands;
   determining an average value of the lateral width of the binaural activity over time and the plurality of sub-bands;
   determining an auditory source width of the noise signals based on the average value of the lateral width of the binaural activity; and
   cutting the binaural activity at one or more edges by applying a cutting function with an adaptive threshold, and where the act of determining the auditory source width comprises determining the auditory source width of the noise signals based on the edge-cut binaural activity.

2. The method of claim 1, where the act of filtering comprises filtering the detected noise signals by a non-uniform auditory bandpass filter bank to obtain the sub-band signals.

3. The method of claim 1, where the act of filtering comprises:
   filtering the detected noise signals by a head-related transfer function; and
   processing output of the head-related transfer function with a non-uniform auditory bandpass filter bank to obtain the sub-band signals.

4. The method of claim 1, where the act of filtering comprises:
   processing the detected signals in a way that corresponds to physiologic filtering of a human outer ear to obtain first filtered signals;
   processing the first filtered signals in a way that corresponds to physiologic filtering of a human middle ear to obtain second filtered signals; and
   processing the second filtered signals with a non-uniform auditory bandpass filter bank to obtain the sub-band signals.

5. The method of claim 1, where the act of determining the binaural activity over time and the lateral width comprises:
   determining interaural time differences and interaural level differences of the sub-band signals; and
   combining the interaural time differences and the interaural level, differences to obtain the binaural activity over time and the lateral width for each of the plurality of sub-bands.

6. The method of claim 5, further comprising half-wave rectifying and low-pass filtering the sub-band signals to obtain half-wave rectified sub-band signals;
   where the act of determining the interaural time differences and the interaural level differences comprises determining the interaural time differences and the interaural level differences of the half-wave rectified sub-band signals.

7. The method of claim 1, where the act of detecting the first and second noise signals comprises binaurally detecting the first and second noise signals through a plurality of sound detection devices installed in artificial ears of a dummy head.

8. The method of claim 1, where the first and second noise signals represent broadband noises including sinusoidally varying interaural time differences.

9. The method of claim 8, where the first and second noise signals are generated according to:

$$l(t) = \sum_{i=1}^{N} A\sin\left(\frac{2\pi f_i t}{F_s} + \theta_i + \pi f_i \Delta t \sin\left(\frac{2\pi F_M t}{F_s}\right)\right)$$

$$r(t) = \sum_{i=1}^{N} A\sin\left(\frac{2\pi f_i t}{F_s} + \theta_i - \pi f_i \Delta t \sin\left(\frac{2\pi F_M t}{F_s}\right)\right),$$

respectively, where A represents an amplitude, where $f_i$ represents carrier frequencies, where $F_M$ represents a modulation frequency, where $F_s$ represents a sampling rate, where $\Delta t$ represents a predetermined maximum interaural time difference, where $\theta_i$ represents arbitrarily chosen phases, and where t represents a discrete time index.

10. The method of claim 1, further comprising estimating the auditory source width by a lateral extent of the binaural activity in single frequency-bands weighted over all auditory frequency bands by applying a weighting curve.

11. The method of claim 1, where the first noise signal is output from a first loudspeaker of a first pair of loudspeakers and a first loudspeaker of a second pair of loudspeakers, where the second noise signal is output from a second loudspeaker of the first pair of loudspeakers and a second loudspeaker of the second pair of loudspeakers, further comprising:
   determining a first averaged auditory source width for the first pair of loudspeakers;
   determining a second averaged auditory source width for the second pair of loudspeakers; and
   weighting the first and second averaged auditory source widths based on the position of the pairs of loudspeakers in a room of a loudspeakers-room system to obtain a single weighted overall auditory source width.

12. The method of claim 1, further comprising setting a determined value of the binaural activity that lies below a predetermined value to zero.

13. The method of claim 1, further comprising adjusting a sound system based on the auditory source width of the detected noise signals.

14. A method for estimating an auditory source width in a loudspeakers-room system, comprising:
   generating a first frequency modulated noise signal and a second frequency modulated noise signal;
   transmitting the first noise signal from a first loudspeaker;

transmitting the second noise signal from a second loudspeaker;

detecting binaurally the first noise signal and the second noise signal to obtain detected signals;

filtering the detected signals in a way that corresponds to physiologic filtering of a human outer ear to obtain first filtered signals;

filtering the first filtered signals in a way that corresponds to physiologic filtering of a human middle ear to obtain second filtered signals;

filtering the second filtered signals by a non-uniform auditory bandpass filter bank to obtain sub-band signals for a predetermined number of sub-bands;

half-wave rectifying and low-pass filtering the sub-band signals to obtain half-wave rectified sub-band signals;

determining interaural time differences and interaural level differences of the half-wave rectified sub-band signals;

combining the interaural time differences and the interaural level differences to obtain a binaural activity over time and a lateral width for each of the predetermined number of sub-bands;

determining an average value of the lateral width of the binaural activity over time and the predetermined number of sub-bands; and determining the auditory source width of the noise signals based on cutting the binaural activity at one or more edges by applying a cutting function with an adaptive threshold, and where the act of determining the auditory source width comprises determining the auditory source width of the noise signals based on the edge-cut binaural activity.

15. A system, comprising:

a binaural recording device configured to detect a first frequency modulated noise signal and a second frequency modulated noise signal;

a non-uniform auditory bandpass filter bank configured to filter the noise signals to obtain sub-band signals for a predetermined number of sub-bands;

means for determining a binaural activity over time and a lateral width for each of the predetermined number of sub-bands;

means for determining an average value of the lateral width of the binaural activity over time and the predetermined number of sub-bands; and means for determining an auditory source width of the noise signals based on cutting the binaural activity at one or more edges by applying a cutting function with an adaptive threshold, and where the act of determining the auditory source width comprises determining the auditory source width of the noise signals based on the edge-cut binaural activity.

16. The system of claim 15, where the binaural recording device comprises a dummy head with a pair of ear-shaped molds each configured to accommodate a sound detection device.

17. The system of claim 15, further comprising means for determining interaural time differences and interaural level differences of the sub-band signals; and where the means for determining the binaural activity over time and the lateral width comprises means for combining the interaural time differences and the interaural level differences to obtain the binaural activity over time and the lateral width for each of the predetermined number, of sub-bands.

* * * * *